Aug. 17, 1926.
H. CLEMENT ET AL
OPTICAL INSTRUMENT
Filed Oct. 19, 1922
1,596,717
2 Sheets-Sheet 1
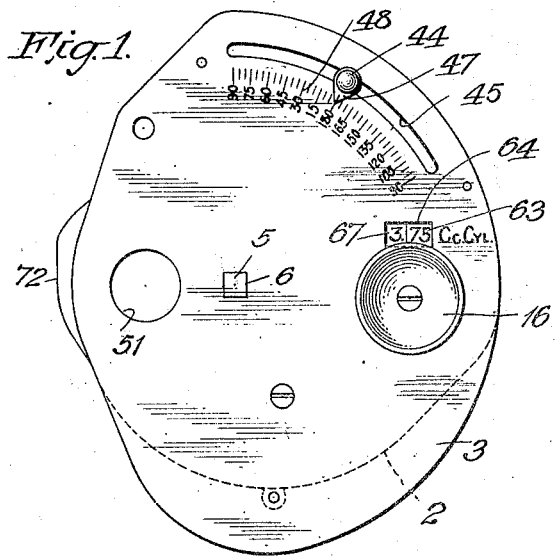
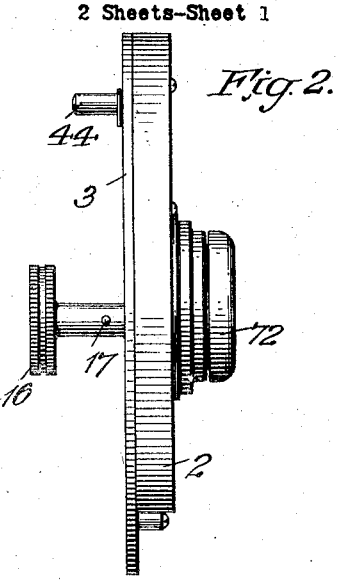
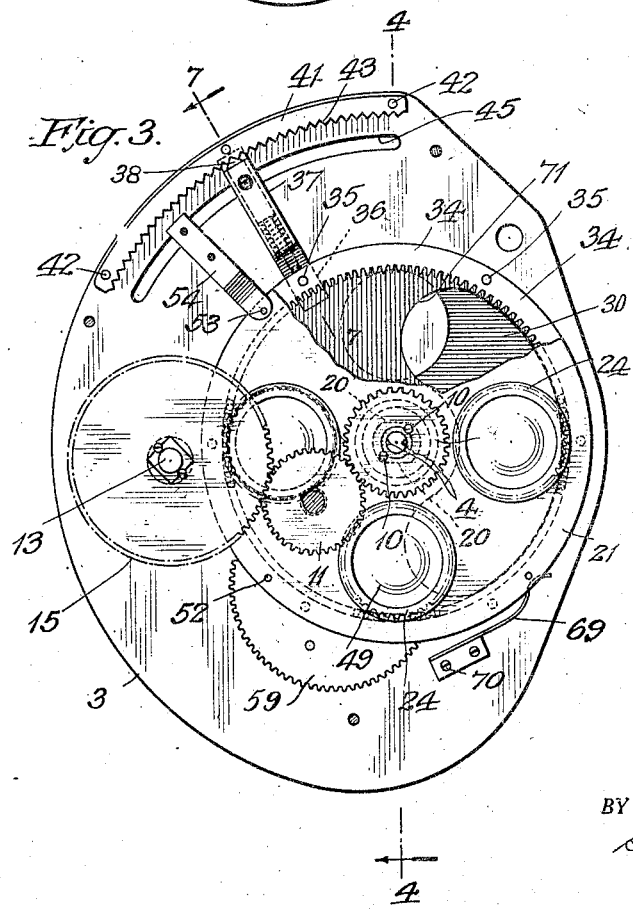
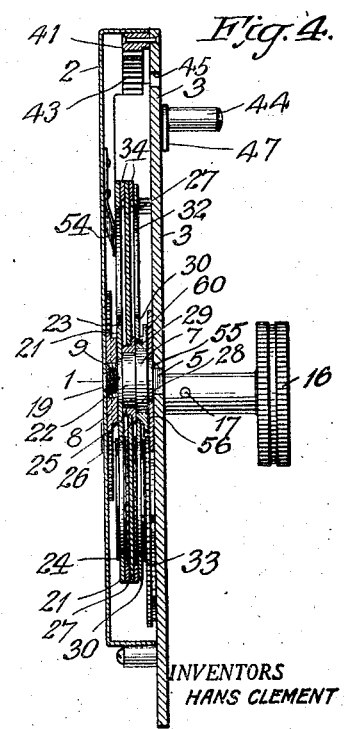
INVENTORS
HANS CLEMENT
BERNARD M. BARRON
BY Stockbridge & Borst
ATTORNEYS.

Aug. 17, 1926.   1,596,717
H. CLEMENT ET AL
OPTICAL INSTRUMENT
Filed Oct. 19, 1922   2 Sheets-Sheet 2
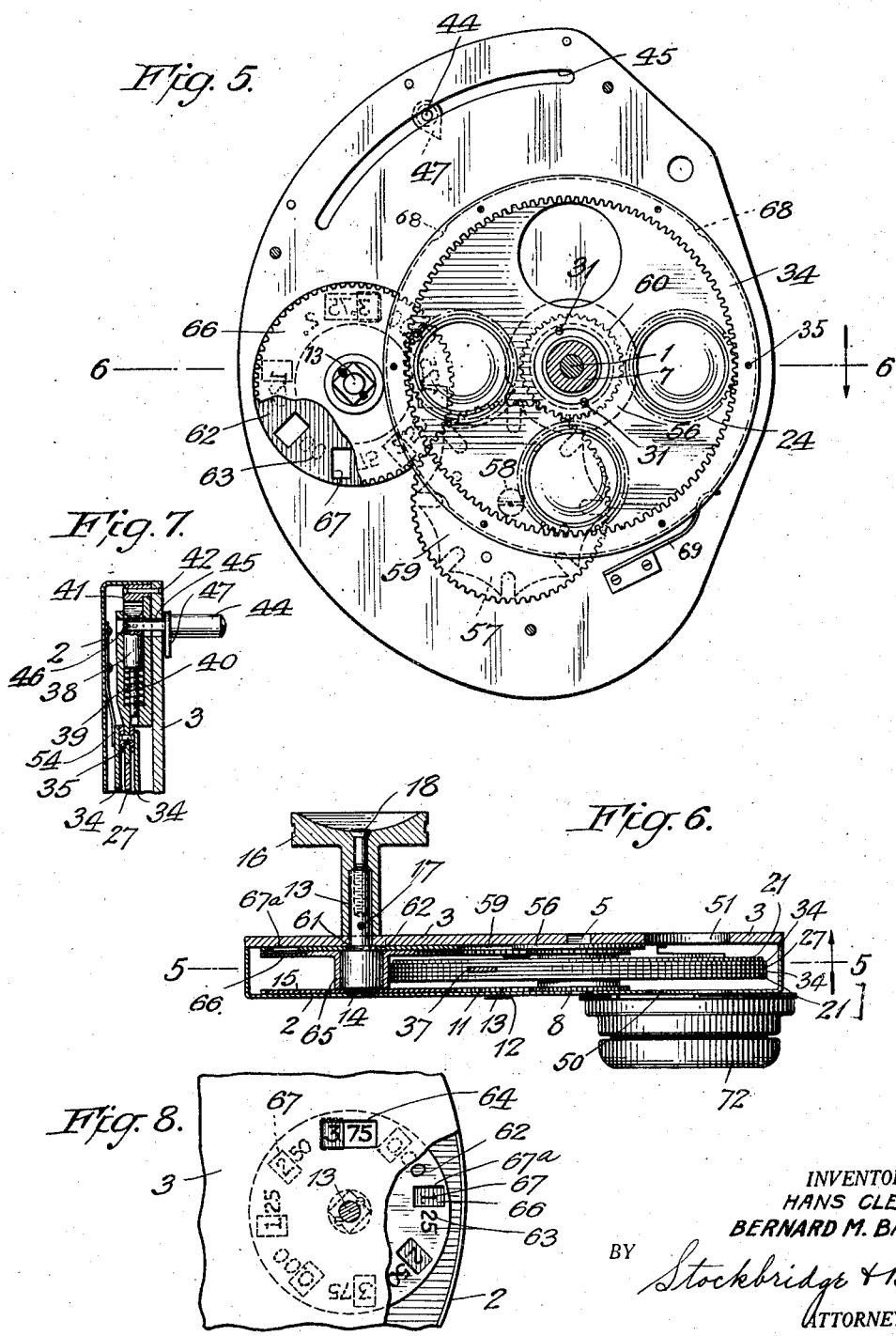
INVENTORS
HANS CLEMENT
BERNARD M. BARRON
BY Stockbridge & Borst
ATTORNEYS.

Patented Aug. 17, 1926.

1,596,717

UNITED STATES PATENT OFFICE.

HANS CLEMENT, OF NEW YORK, AND BERNARD M. BARRON, OF MOUNT VERNON, NEW YORK, ASSIGNORS TO GENERAL OPTICAL COMPANY, INC., A CORPORATION OF NEW YORK.

OPTICAL INSTRUMENT.

Application filed October 19, 1922. Serial No. 595,511.

This invention relates to improvements in optical instruments of the type utilized in the examination of the eyes for various refractive conditions, and more particularly to those that are provided with one or more lens batteries, each having a plurality of lenses of different strength which may be brought successively into eye examination positions. An object of the invention is to provide an improved instrument of this type having novel means for bringing the individual lenses of each battery successively into examination positions in such a manner that the lenses may be used either singly or in various combinations between the lenses of the batteries, and to provide improved novel means for indicating the powers of the lenses or lens combinations which at any time are in examination positions. A further object is to provide improved means for simultaneously and accurately adjusting the axes of cylindrical lenses which are carried by one or more of the batteries. A further object is to provide an improved instrument for accomplishing the above results which is comparatively simple, compact, durable, convenient and inexpensive. Other objects and advantages will be apparent from the following description of an embodiment of the invention and the novel features will be particularly pointed out hereinafter in claims.

In the accompanying drawings:

Fig. 1 is a front elevation of the portion of an optical instrument in which this invention is embodied.

Fig. 2 is a side elevation of the same.

Fig. 3 is a front elevation of the same on a larger scale, with a part of the casing removed and other parts broken away to show normally concealed parts.

Fig. 4 is a section of the same taken substantially along the line 4—4 of Fig. 3.

Fig. 5 is a section of the same taken substantially along the line 5—5 of Fig. 6.

Fig. 6 is a section of the same taken substantially along the line 6—6 of Fig. 5.

Fig. 7 is a section of the same taken substantially along the line 7—7 of Fig. 3.

Fig. 8 is a fragmentary elevation of the indicating mechanism for showing the powers of the lenses in alignment with the sight opening at any time.

In the illustrated embodiment of the invention a stud 1 (see Fig. 5) extends through and between the opposite walls 2 and 3 of a suitable enclosing casing for the instrument, the end of the stud which passes through the wall 2 being slightly reduced so as to form a shoulder against which the wall 2 is held by suitable screws which pass through threaded apertures 4 that are formed partly in the casing and partly in the stud. The other end 5 of the stud which passes through the wall 3 is square and is received within a square aperture 6 in the wall 3. A bushing 7 is rotatably carried by the stud 1 between the walls 2 and 3 of the casing, and is provided with annular peripheral steps. A gear 8 is threaded upon the step portion 9 of the bushing 7 against a shoulder formed by the next step portion. The gear is held against relative movement on the threaded step by screws 10, which are threaded into apertures formed jointly between the gear and the bushing, and which act as keys that lock the gear to the bushing. The gear 8 meshes with an idler gear 11 that is rotatably carried by a stud 12 on the inner face of the wall 2.

A stem 13 extends through and has rotatable engagement in the walls 2 and 3. The stem, upon a square portion 14 thereof and within the casing, carries a gear 15 which is fixed thereto by reason of its square aperture which fits over the square portion 14. This gear 15 meshes with the idler gear 11 so that when the stem 13 is rotated it will, through the gears 15 and 11, rotate the gear 8 and bushing 7. An operating button 16 passes over an outward extension of the stem 13 and is fixed thereto by a pin 17 passing through both the button and stem, and also by a screw 18 which passes through the button axially into the end of the stem upon which the button is secured.

The step portion 19 of the bushing 7 immediately adjoining the step portion 9 thereof is milled off to provide two parallel sides 20, and a disc 21, provided with an aperture which corresponds to the step portion 19, fits over the same against a shoulder of the bushing formed by the junction of this step portion with a larger step portion 22 thereof. The disc 21 is provided between its center and periphery with a circular row of apertures 23, in all but one of which lens mountings 24 are mounted for rotation about the aperture axis.

A sleeve or bushing 25 is rotatably mounted upon the step portion 22 of the bushing 7 and is provided at one end with an annular flange 26. A disc 27 is secured upon the periphery of the sleeve or bushing 25 and keyed to the flange 26 thereto in any suitable manner such as by rivets, or by shrinking or forcing the disc thereon, so that the disc and sleeve or bushing will rotate as a unit. The bushing 25 is held in position upon the step portion 22 by the disc 21 which abuts against the end of the bushing and confines it against a shoulder formed between the step portion 22 and a larger step portion 28.

A bushing or sleeve 29 is rotatably mounted upon the step portion 28 and at one end adjoining the flange 26 is reduced in diameter and carries a disc 30 on the reduced portion. The disc 30 may be fixed upon the sleeve 29 in any suitable manner such as by screws 31 which are threaded endwise into the sleeve and the disc in apertures formed partly in the disc and partly in the end face of the bushing. The screws 31 also act as keys to prevent rotation of the disc relatively to the sleeve or bushing 29. The disc 30 is provided between its center and periphery with a circular row of apertures 32, which by rotation of the disc may be brought successively into alignment with any of the apertures in the other disc 21. Lens mountings 33 are rotatably mounted in all but one of the apertures 32 of the disc 30. All of the lens mountings 24 and 33 in both discs 21 and 30 are provided upon the ends facing one another with external peripheral gear teeth.

An annulus 34 provided with internal gear teeth is mounted by rivets 35 upon each face of the disc 27 along its periphery, with the gear teeth of each annulus in mesh with the peripheral gear teeth of each of the lens mountings carried by the adjoining disc. Whenever relative rotation occurs between either the disc 21 or 30 and the disc 34, the meshing of the gear teeth of each annulus with the lens mountings will cause simultaneous and equal rotation of each mounting about the axis of the aperture in which it is mounted.

The disc 27 is provided in its periphery with a radially extending notch 36 in which one end of an operating arm 37 is disposed and secured therein by one of the pins 35 which passes through both annuli and through the arm 37. The arm 37 will therefore be held within the slot 36, and will serve as a handle by means of which the disc 27 may be rotated. The outer end of the arm is tubular, and a plunger 38 is mounted for reciprocation therein in a direction radially with respect to the disc 27. The plunger at its inner end has a reduced portion 39 which is surrounded by a coil spring 40 that is compressed between the plunger and a wall of the plunger when the plunger is forced into the tubular arm from the outer end. An arcuate strip 41 having a center of curvature substantially coincident with the axis of rotation of the disc 27 is secured upon the inner face of the wall 3 in a suitable manner such as by rivets 42, and upon its inner curved wall is provided with notches 43 into which the outer end of the plunger 38 is projected by the spring 40.

A handle 44 extends through an arcuate slot 45 in the wall 3 of the casing, the center of curvature of the slot being substantially coincident with that of the arcuate strip 41. The handle at its inner end is secured in an aperture in the plunger 38 in any suitable manner such as by a screw 46. The slot 45 is wide enough to permit of the movement of the handle 44 radially of the curvature of the slot, sufficiently to disengage the plunger 38 from the notches 43 of the arcuate strip 41. Thus by shifting the handle 44 inwardly, the plunger 38 may be disengaged from the arcuate strip and the arm shifted along the slot, which movement serves to rotate the disc 27 through a portion of a revolution. After the disc 27 has been rotated through the desired angle and the handle 44 has been released, the plunger 38 will be projected by the spring 40 into another of the notches 43 in the arcuate strip and by its engagement therein will prevent further rotation of the disc 27. The handle 44 carries an indicating pointer 47 which overlies a portion of the outer face of the wall 3 and cooperates with a suitable scale 48 thereon for indicating the position of the handle 44.

Each lens mounting carries therein a cylindrical lens 49 (see Fig. 3) for rotation therewith, and the discs 21 and 30 may be individually rotated to bring any of the lens mountings and lenses into alignment with aligned apertures 50 and 51 in the walls 2 and 3 respectively. The apertures 50 and 51 serve as sight openings through which the examination of an eye is effected. The aperture in each disc 21 and 30, which is not provided with a lens mounting and lens, may be brought into alignment with the sight openings 50 and 51, whenever the use of any lens in the corresponding disc is not desired.

The disc 21 is provided upon the face toward the wall 2 with circularly arranged depressions 52, one for each aperture 23 of the disc, into which depressions a pin 53 carried upon the end of the spring arm 54 on the inner face of the wall 2 may snap whenever the disc 21 is rotated to bring one of the apertures 23 into alignment with the sight openings 50 and 51. In this manner the disc 21 will be held with an aperture 23 thereof in alignment with the sight openings 50 and 51 until sufficient torque is applied to the disc to force the pin 53 against the action of the spring arm 54 out of the depression 52.

Upon the reduced step portion 55 of the bushing 7 and adjacent the wall 3, a one-tooth Geneva transfer member 56 is mounted for rotation with the bushing 7. The step portion 55 may be provided with flat portions upon opposite sides and the Geneva movement member 56 may be provided with an aperture fitting the periphery of the step portion 55 so as to insure rotation together of the member 56 and the bushing 7. A second Geneva transfer member 57 is rotatably mounted upon a stub shaft 58, which may comprise a screw upon the inner face of the wall 3, in a position to cooperate with and be operated by the one-tooth Geneva transfer member 56 which rotates with the bushing 7.

The Geneva member 57 is attached to a gear 59 which meshes with gear teeth provided upon the periphery of a flange 60 of the sleeve or bushing 29. Thus at each rotation of the disc 21 the attached bushing 7 will be rotated through one revolution and since the Geneva member 56 is attached to the bushing 7 it will also be rotated through one revolution for each revolution of the disc 21. The Geneva member 56 will therefore operate the gear member 57 and its attached gear 59 through the distance between the successive teeth of the Geneva member 57 for each revolution of the bushing 7 and disc 21. The notches forming the teeth in the Geneva member 57 correspond in number to the number of apertures in the disc 30 so that at the completion of each of the revolutions of the disc 21, the apertures in the disc 30 will be brought successively into alignment with the sight openings 50 and 51 of the casing.

The stem 13 adjacent the inner face of the wall 3 is provided with a square periphery 61, and a disc 62 is fitted over the square portion so as to rotate with the stem. The disc 62 is provided upon the face towards the wall 3 with suitable indicia 63, which during rotation of the disc will be brought successively into view through an indicator sight opening or aperture 64 in the wall 3 of the casing, each indicia being visible through the sight opening 64 whenever one of the apertures 23 of the disc 21 is in alignment with the sight openings 50 and 51 of the casing so as to indicate the power of the lens then in alignment with the lens sight openings 50 and 51. A sleeve 65 (Fig. 6) is rotatably mounted upon the stem 13 between the disc 62 and the gear 15, and is provided with an outwardly extending flange 66 which carries upon the face thereof toward the wall suitable indicia 67 (Figs. 1 and 8) which may be brought successively beneath the indicator sight opening 64 of the wall 3. The flange 66 is provided with peripheral gear teeth which mesh with the gear teeth of the gear 59, so as to be driven therefrom.

At each increment of rotation of the gear 59 which is caused by the driving engagement between the two Geneva transfer members, the flange 66 will be given an increment of rotation so as to bring a new indicia beneath the indicator sight opening 64. The disc 62 is provided with apertures $67^a$ adjacent the indicia thereon, so that the indicia upon the flange 66 will be visible through the aperture $67^a$ of the disc 62 after the increments of rotation. The indicia are so disposed upon the disc 62 and flange 66 that when visible through the sight opening 64 they will read together for indicating directly the combined powers of those lenses carried by the two discs 21 and 30, which are then in alignment with one another and with the sight openings 50 and 51.

The periphery of the disc 30 is provided with a plurality of notches 68 (Fig. 5) at intervals corresponding to the number of apertures in the disc, and a spring 69 secured at one end by screws 70 to the wall 3 of the casing bears at its free end upon the periphery of the disc 30 so as to snap into the notches 68 successively as the disc is rotated. The engagement of the spring 69 in a notch serves to yieldingly hold the disc against accidental rotation, with one of the apertures of the disc in alignment with the sight openings 50 and 51 of the casing. The end of the spring 69 in contact with the disc periphery is preferably bowed so as to be cammed out of the notch when the disc is given sufficient rotative torque in either direction. The engagement of the spring 69 in the notches 68 also serves to assist the operator who is manipulating the button 16 in determining by the degree of the turning torque necessary to cause rotation, that one of the apertures of the disc is in alignment with the lens sight openings 50 and 51. The pin 53 snapping into one of the depressions 52 in the disc 21 also serves to indicate to the operator that one of the apertures 23 of the disc 21 is in alignment with the sight openings 50 and 51.

The disc 27 is provided with an arcuately elongated aperture 71 which uncovers the apertures 50 and 51 of the casing during the entire angular movement or rotation of the disc 27 by the manipulation of the handle 44 in adjusting the positions of the axes of the cylindrical lenses. An eye piece 72 may be provided upon the wall 2 in alignment with the aperture 50 for a purpose well known in the art.

When the lenses are placed in the lens mountings they are positioned therein with their axes in such positions relatively to the mountings that when the discs 21 and 30 are rotated to bring each lens into alignment with the sight openings 50 and 51, the axes of the lenses will all make the same relative angles to the radius of the carrying disc when brought into the same relative positions.

In the use of the instrument it is supported before the patient's face with the eye piece 72 directly in front of the eye under examination. The oculist then rotates the button 16, and the latter through the stem 13, gears 15, 11 and 8 rotates the bushing 7 and the disc 21 carried thereby. As the disc 21 rotates, the apertures 23 thereof are brought successively into alignment with the eye piece and the sight openings 50 and 51 of the casing. When the aperture of the disc 21 which carries no lens mounting or lens, is brought into alignment with the eye piece and sight opening, light rays will be able to pass from the examination charts (not shown) through the aperture of the disc and the eye piece, to the patient's eye without undergoing refraction, assuming of course that the aperture 32 of the disc 30 at this time is also in alignment with the eye piece. The disc 27 does not obstruct the passage of light rays through the eye piece and disc because of the arcuately elongated aperture 71 therein which is always before the eye piece.

Rotation of the disc 21 will carry the lens mountings with their lenses successively before the eye piece so as to modify the light rays which pass from the chart to the patient's eyes in accordance with the power of the lens before the eye piece at any time. The disc 62 rotates with the stem 13 while the stem is being operated to rotate the disc 21, and the indicia 63 thereon will be brought successively into view through the indicator sight opening 64 concomitantly with the movement of a new lens into alignment with an eye piece, so that the indicia 63 appearing through the sight opening 64 will always represent the power of the particular lens in the disc 21 which is then in alignment with the eye piece and therefore active upon the light rays passing to the patient's eye.

During the completion of a rotation of the disc 21 while the lensless aperture 23 thereof is moving into aligned position with respect to the eye piece, the Geneva transfer member 56, which is rotatable with the bushing 7 and the disc 21, will likewise complete a revolution and in doing so the single transfer tooth thereon will engage in one of the notches of the Geneva transfer member 57 and rotate the latter through one increment of movement. The member 57 in its movement, will impart a corresponding increment of movement to the gear 59 which is fixed thereto, and the latter, by its meshing engagement with the sleeve 29 attached to the disc 30, will impart a corresponding increment of rotation to the disc 30 and carry one of the lenses thereof into alignment with the sight openings 50 and 51 and the eye piece 72.

Concomitantly with this operation the gear 59 also, because of its meshing engagement with the flange 66 of the sleeve 65, will impart to the sleeve 65 a corresponding increment of rotation and carry one of the indicia 67 thereon into view through the sight opening 64 at the same time that the corresponding lens of the disc 30 moves into alignment with the eye piece. The engagement of the curved periphery of the Geneva transfer member 56 in a concavity in the periphery of the transfer member 57 between adjoining notches, locks the transfer member 57 against rotation until the tooth of the member 56 moves into locking engagement with one of the notches of the member 57. This locking action of the Geneva transfer member is well known and therefore further details of it are omitted in the interest of brevity.

In these relative positions of the discs 21 and 30 the lensless aperture of the disc 21 will permit of the passage of light rays to the patient's eye unaffected so far as the disc 21 is concerned, but such rays will pass through the lens of the disc 30 which is then before the eye piece. The power of this single lens is indicated by the indicia 67 which is then visible through the sight opening 64. Further rotation of the button 16 in the same direction will carry one of the lenses of the disc 21 into alignment with the eye piece without operating further the disc 30. In these relative positions of the discs 21 and 30 the two aligned lenses will both act together upon the light rays passing through the eye piece and the combined power of these lenses will be indicated by the combined indicia then appearing through the sight opening 64.

Further rotation of the button 16 will carry another of the lenses of the disc 21 into alignment with the eye piece and it will act in combination with the lens of the disc 30 still remaining before the eye piece to affect the light rays passing through the eye piece in accordance with the combined powers of the lenses. The combined powers will be indicated by the combined indicia appearing through the sight opening 64 because the indicia 63 of the disc 62 will be moving successively into view through the sight opening at each change in the lenses of the disc 21 before the eye piece. During further rotation of the button 16 the lenses of the disc 21 will be successively brought before the eye piece 72 and during the completion of a second rotation of the disc 21 the transfer mechanism between the discs 21 and 30 will again become effective and a second lens in the disc 30 will be brought before the eye piece concomitantly with the movement of the lensless aperture of the disc 21 before the eye piece. The indicia 67 then visible through the sight opening 64 will indicate the power of the single lens of the disc 30 then before the eye piece, the indicia 63 of the disc 62 being 0 0 in this reading.

During further rotation of the button 16 the disc 30 will remain stationary and the lenses of the disc 21 will be successively brought before the eye piece so as to provide a combined effect with the lens of the disc 30 then before the eye piece. Thus the button 16 can be rotated until the lenses in the two discs are brought into the desired relative arrangement which provides the desired combined power for the examination. The combined powers of the lenses before the eye piece will always be indicated through the sight opening 64. For example in the illustration the power of the lenses in alignment with the eye piece is 3.75.

When it is desired to change the axes of the lenses the handle 44 is operated radially and inwardly so as to disengage the plunger 38 from the notches 43 of the arcuate strip 41, after which the handle 44 can be shifted along the slot 45 until the pointer 47 on the handle indicates upon the scale 48 the angular position desired for the major axis for any of the lenses carried by either disc. The handle 44 is then released and the spring 40 will project the plunger 38 automatically into locking engagement in one of the notches 43 of the arcuate strip 41 and thus prevent unintentional displacement of the locking arm 37. This movement of the arm 37 rotates the disc 27 through a corresponding angular distance and the annuli 34 carried by the disc 27, which are always in meshing relation with and surrounding the lens mountings carried by both discs 21 and 30, will rotate the lens mountings a proportional angular extent and change the axes of all the lenses the desired amount. The division of the scale 48 directly beneath the pointer 47 at any time indicates the angle of the axis of the lens in either or both discs 21 and 30 which is then in alignment with the eye piece 72.

As the discs 21 and 30 are rotated to bring the lenses thereof successively before the eye piece, the disc 27 and annuli 34 will be stationary and owing to the meshing engagement of the internal teeth of the annuli and the teeth of the lens mountings the lens mountings in the moving disc or discs will be rotated about their own axis as well as bodily with the disc so that when they are brought into alignment with the eye piece 72 their major axis will have the same angular relation as that indicated upon the scale 48 by the pointer 47.

It will be noted that the instrument hereinbefore described and illustrated two discs carrying cylindrical lenses are provided which can be brought successively into alignment with the eye piece either singly or in combination, and in this manner the range of lens powers available can be very greatly increased without increasing the width of the instrument, and by only very slightly increasing the thickness of the instrument. With this arrangement a common operating member is provided for shifting the axes of the lenses carried by both discs, and this member does not obstruct vision through the eye piece and sight openings of the casing. The instrument is illustrated as adapted for the examination of but a single eye at a time and it is to be understood that a counterpart may be provided so that both eyes of the patient may be examined concomitantly.

It is obvious that various modifications in the details and arrangements of parts herein described and illustrated for the purpose of explaining the nature of the invention may be made by those skilled in the art within the principle and scope of the invention.

We claim:

1. In an optical instrument, a support, a pair of disc members carried by the support for independent rotation about a common axis, a plurality of lens mountings rotatably carried by each member eccentrically of the axis of rotation of the members, a cylindrical lens carried by each mounting for rotation therewith, a gear member carried by the support between the disc members for rotation about the common axis, said gear member being provided upon each face with internal annular gear teeth surrounding the group of lens mountings on the adjacent disc member and meshing with the teeth of each, whereby angular rotation of the gear member will rotate all the lenses of both disc members concomitantly and correspondingly about their individual axes, and means for rotating the gear member through portions of a revolution to change the axes of all the lenses concomitantly and equally.

2. In an optical instrument, a support, three discs carried by the support for independent rotation about a common axis, a plurality of lens mountings rotatably carried in apertures in both of the outside discs, said mountings in each disc being arranged around the disc in the space between the center and periphery and at equal distances from the common axis and provided with gear teeth, a cylindrical lens carried by each mounting for rotation therewith, and an annulus secured to each face of the middle disc, concentrically of the common axis, and having gear teeth meshing with the gear teeth of the lens mountings of the adjacent disc whereby rotation of the middle disc will rotate the lenses of both discs concomitantly and equally about their individual axes.

3. In an optical instrument, a support, a pair of disc members carried by the support for independent rotation about a common axis, a plurality of lens mountings rotatably carried by each member eccentrically of the axis of rotation of the members, a cylindrical lens carried by each mounting for rotation therewith, a gear member carried by the support between the disc members for rotation about the common axis, said gear member being provided upon each face with gear teeth meshing with the teeth of all of the lens mountings upon the adjacent member, whereby rotation of the gear member will impart rotation to all of the lens mountings of both disc members so as to vary the axes of the lenses in both disc members concomitantly and equally.

4. In an optical instrument, a support, three discs carried by the support for independent rotation about a common axis, a plurality of lens mountings rotatably carried in apertures in both of the outside discs, said mountings in each disc being arranged around the disc in the space between the center and periphery and at equal distances from the common axis and provided with gear teeth, a cylindrical lens carried by each mounting for rotation therewith, and an annulus secured to each face of the middle disc, concentrically of the common axis, each annulus surrounding all of the mountings of the adjacent disc, and having gear teeth meshing with the gear teeth of the lens mountings of the adjacent disc whereby rotation of the middle disc will rotate the lenses of both discs concomitantly and equally about their individual axes.

5. In an optical instrument, a support, three discs carried by the support for independent rotation about a common axis, a plurality of lens mountings rotatably carried in apertures in both of the outside discs, said mountings in each disc being arranged around the disc in the space between the center and periphery and at equal distances from the common axis and provided with gear teeth, a cylindrical lens carried by each mounting for rotation therewith, an annulus secured to each face of the middle disc concentrically of the common axis, and having gear teeth meshing with the gear teeth of the lens mountings of the adjacent disc, whereby rotation of the middle disc will rotate the lenses of both discs concomitantly and equally about their individual axes, the middle disc having a notch in its periphery and extending between the annuli, an operating arm inserted between the annuli into the notch of the middle disc, and securing means passing through the inserted end of the arm and the annuli for preventing displacement of the arm from the notch.

6. In an optical eye examination instrument, a casing, two members rotatable in said casing about a common axis, means for mounting a plurality of cylindrical lenses on one member for rotation about axes equally distant from the common axis, said means each having gear teeth whereby the lenses can be rotated, gear teeth on the other of said members meshing with the teeth of the lens mountings to rotate the mountings upon relative rotation between the members, a locking pin slidably carried by the other of said members, a locking member carried within the casing and having a notched arcuate surface in proximity to which a locking tongue of the pin moves, spring means for resiliently urging the locking pin in a direction to carry the tongue into one of the notches of the locking member and prevent rotation of the pin carrying member, said casing having therein an arcuate slot in proximity to the path of arcuate movement of the pin and a scale along the slot, a handle on said pin extending through said slot and having a pointer cooperating with the scale.

7. In an optical instrument, a pair of elements individually rotatable about a common axis, lens mountings rotatably carried by said elements between the axes of rotation and the peripheries of said elements, each mounting having gear teeth, a cylindrical lens carried by each mounting, and a common gear member meshing with the gear teeth of the mountings of both elements for concomitantly and equally rotating the mountings about their individual axes upon relative movement between either or both of the elements and the gear member.

8. In an optical instrument, a casing having a lens sight opening and an indicator sight opening, a plurality of batteries of lenses mounted in the casing for movement to carry the lenses into alignment with the lens sight opening singly and in selected combinations of lenses of the two batteries, a stem rotatably carried by the casing, a disc carried by the stem and rotatable beneath the indicator sight opening a gearing connection between the stem and one of the batteries of lenses whereby operation of the stem will rotate the connected battery to bring the different lenses thereof successively beneath the indicator sight opening, a transfer connection between the batteries whereby during the completion of each revolution of said one of the batteries the other battery will be operated through a distance equal to that between two successive lenses thereof, a second indicator disc mounted in said casing for movement beneath the indicator sight opening, and means for operating the second disc concomitantly with the operation of the said other lens battery, said discs each having suitable indicia thereon visible through the indicator sight opening, the indicia reading through the sight opening indicating the power of the lens or lenses which is or are then aligned with the lens sight opening.

9. In an optical instrument, a casing having a lens sight opening and an indicator sight opening, a plurality of batteries of lenses mounted in the casing for movement to carry the lenses into alignment with the lens sight opening singly and in selected combinations of lenses of the two batteries, a stem rotatably carried by the casing, a disc carried by the stem and rotatable beneath the indicator sight opening, a gearing connection between the stem and one of the batteries of lenses whereby operation of the stem will rotate the connected battery to bring the different lenses thereof successively beneath the indicator sight opening, a transfer connection between the batteries whereby during the completion of each revolution of said one of the batteries the other battery will be operated through a distance equal to that between two successive lenses thereof, a second indicator disc rotatably mounted on the stem and within the casing, and means for operating the second disc concomitantly with the operation of the said other lens battery, said discs each having suitable indicia thereon visible through the indicator sight opening, the indicia reading through the sight opening indicating the power of the lens or lenses which is or are then aligned with the lens sight opening.

10. The optical instrument as set forth in claim 8, wherein the disc rotating with the stem is provided with apertures adjacent which the indicia are placed, and the other disc is below the apertured disc and carries its indicia so as to be visible through the aperture in the other disc, and form with the indicia on the apertured disc a compound indicia of reference of the combined strengths of aligned lenses in said batteries.

11. The optical instrument as set forth in claim 9, wherein the disc rotating with the stem is provided with apertures adjacent which the indicia are placed, and the other disc is below the apertured disc and carries its indicia so as to be visible through the aperture in the other disc, and form with the indicia on the apertured disc a compound indicia of reference of the combined strengths of aligned lenses in said batteries.

12. In an optical instrument, a plurality of batteries of lenses, means for bringing the lenses into various combinations in alignment for eye examination purposes, superposed indicating discs independently rotatable, means connecting each disc to a battery for operation concomitantly therewith, one of the discs having apertures therein spaced proportionally in an angular rotative direction to the spacing of the lenses in the connected battery and adjacent the apertures having indicia representing the power of a corresponding lens in the connected battery, and indicia arranged upon the other disc to be brought successively into view through the apertures of the other disc so as to be read with the indicia of the apertured discs as a single indicia to indicate the combined powers of lenses of the batteries which are in alignment, in the relative positions of the discs and batteries occupied at any reading.

13. In an optical instrument, a plurality of batteries of lenses, means including a common operating member for bringing the lenses into various combinations in alignment for eye examination purposes, superposed indicating discs independently rotatable, means connecting each disc to a battery for operation concomitantly therewith, one of the discs having apertures therein spaced proportionally in an angular rotative direction to the spacing of the lenses in the connected battery and adjacent the apertures having indicia representing the power of a corresponding lens in the connected battery, and indicia arranged upon the other disc to be brought sucessively into view through the apertures of the other disc so as to be read with the indicia of the apertured discs as a single indicia to indicate the combined powers of lenses of the batteries which are in alignment, in the relative positions of the discs and batteries occupied at any reading.

14. In an optical instrument, a casing having a lens sight opening and an indicator sight opening, a plurality of batteries of lenses mounted in the casing for movement to carry the lenses into alignment with the lens sight opening singly and in selected combinations of lenses of the two batteries, a stem rotatably carried by the casing and accessible for operation from the exterior thereof, a disc fixed on the stem immediately within the casing with a portion of a face thereof visible through the indicator sight opening, a gear fixed on the stem within the casing and connected to rotate one of the batteries to carry the lenses thereof successively into alignment with the lens sight opening, transfer means between the batteries for operating the other of the batteries one increment of movement for each selected extent of rotation of said one battery, a second disc rotatably carried by the stem between the gear and the other disc, a driving connection between the second disc and said other of the batteries for operation therefrom through an increment of rotation at each increment of movement of the connected battery, said discs each having thereon suitable indicia successively brought into positions in which they can be read through the sight opening and representing the powers of the lenses in the battery connected thereto, the first mentioned disc having apertures therein adjacent its indicia to expose the indicia on the second disc, the combined indicia visible through the indicator sight opening at any time indicating the combined power of lenses of the batteries then in alignment with the lens sight opening.

In witness whereof, we hereunto subscribe our signatures.

HANS CLEMENT.
BERNARD M. BARRON.